United States Patent
Spadaccini et al.

(10) Patent No.: US 6,338,288 B1
(45) Date of Patent: Jan. 15, 2002

(54) RAILROAD BRAKE CONTROLLER LOCKING DEVICE

(75) Inventors: Michael J. Spadaccini, Dexter; Ronald O. Newton, Adams, both of NY (US)

(73) Assignee: New York Air Brake Corp., Watertown, NY (US)

(*) Notice: Subject to any disclaimer, the term of this patent is extended or adjusted under 35 U.S.C. 154(b) by 0 days.

(21) Appl. No.: 09/521,435

(22) Filed: Mar. 8, 2000

(51) Int. Cl.[7] .......................... G05G 5/28; B60R 25/08
(52) U.S. Cl. .............................. 74/529; 74/526; 70/247
(58) Field of Search .......................... 74/529, 532, 526, 74/527; 70/247, 192, 201, 202

(56) References Cited

U.S. PATENT DOCUMENTS

| | | | | |
|---|---|---|---|---|
| 4,183,257 A | * | 1/1980 | Lovenduski | 74/526 X |
| 4,548,094 A | * | 10/1985 | Huitema et al. | 74/526 |
| 5,062,316 A | * | 11/1991 | Lykken et al. | 74/529 |
| 5,309,744 A | * | 5/1994 | Kito et al. | 70/247 |
| 5,458,021 A | * | 10/1995 | Wichelt et al. | 74/529 X |
| 5,490,403 A | * | 2/1996 | Bianco, Sr. | 70/247 X |
| 5,499,553 A | * | 3/1996 | Schott et al. | 74/526 |
| 5,775,141 A | * | 7/1998 | Li | 70/247 X |
| 5,778,710 A | * | 7/1998 | Hu et al. | 74/526 X |

* cited by examiner

Primary Examiner—Mary Ann Green
(74) Attorney, Agent, or Firm—Barnes & Thornburg

(57) ABSTRACT

A rail brake controller with a locking device includes a handle coupled to a hub. The hub includes a notch. A pawl is provided adjacent the hub and rotates between an unlocked position out of the notch and a locked position in the notch when the handle is in a preselected angular position. This position may represent, for example, a full service application. A lock assembly is provided coupled to the pawl and controls the position of the pawl. The pawl includes an arcuate recess and the lock assembly includes a pin in the arcuate recess to limit the angular position of the pawl.

11 Claims, 4 Drawing Sheets

RAILROAD BRAKE CONTROLLER LOCKING DEVICE

BACKGROUND AND SUMMARY OF THE INVENTION

The present invention relates generally to brake controllers and more specifically to a brake controller including a locking device.

Railroad brake controllers generally include at least one if not two handles whose rotary positions determine the amount of braking. Generally, there is an automatic brake handle which controls train brakes and an independently brake handle which provides separate control of the locomotive brake. Historically, a key is provided for the brake system. Prior to the system being turned on, the position of the handles would have no effect on the brake system. There are certain times where the train is activated, and it is desirable to lock the handle in a full service position. This keeps the brakes applied. To prevent unauthorized movement of the brake handle from the full service position or accidental movement, a locking device is provided according to the present invention.

The locking device of the present invention includes a hub to which the brake handle is connected. The hub includes a notch. A pawl is provided adjacent the hub and rotates between an unlocked position out of the notch and a locked position in the notch when the handle is in a predetermined angular position. This position may represent for example, a full service application. A lock assembly is provided coupled to the pawl and controls the position of the pawl. The pawl is positively retained in its locked and unlocked position. The pawl can further include two circumferentially spaced recesses defining a locked and unlocked position of the pawl. A plunger is also provided which engages the pawl and is in the path of the recess. The plunger retains the pawl in its locked and unlocked positions.

The handle and hub rotated about the horizontal axis where the pawl rotates about a vertical axis. The brake controller generally includes a housing having a cover and the handle and a portion of the lock extends through the handle and exterior of the housing. The pawl may further include an arcuate recess and the lock includes a pin in the recess to limit the angular position of the pawl.

The locking device may be part of a newly manufactured brake controller or a retrofit kit. The kit would provide a replacement hub including the recess, and the pawl. It would also include the plunger with a bracket. The pawl and lock assembly would be mounted to a brake assembly.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
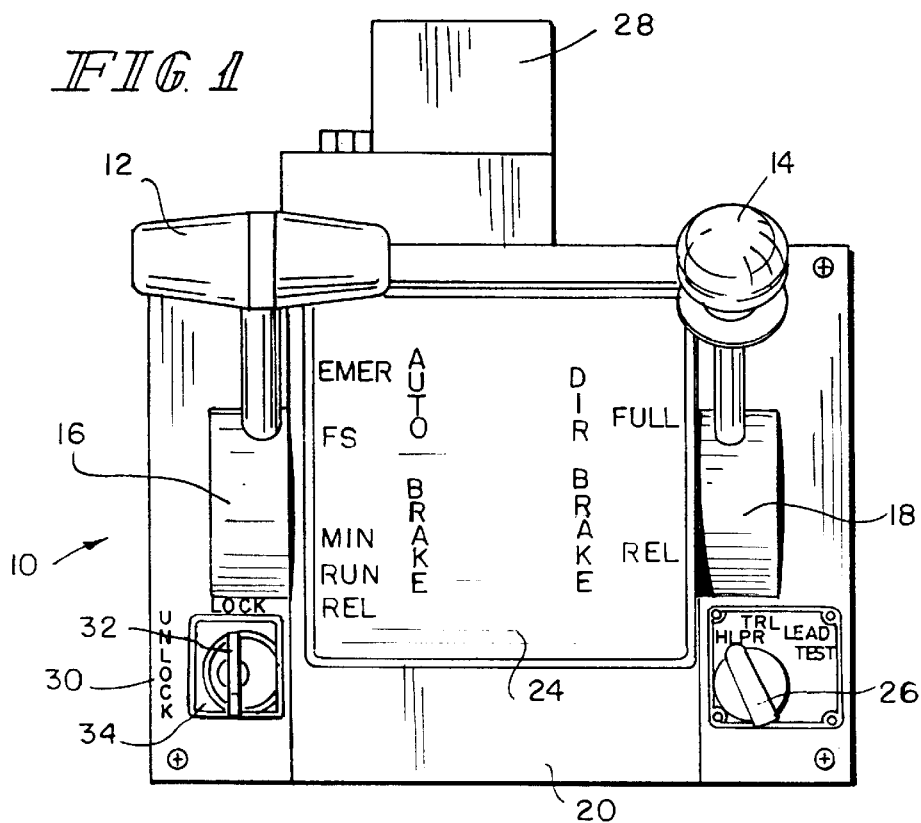
FIG. 1 is a plan view of a brake controller according to the principles of the present invention.
Figure 2:
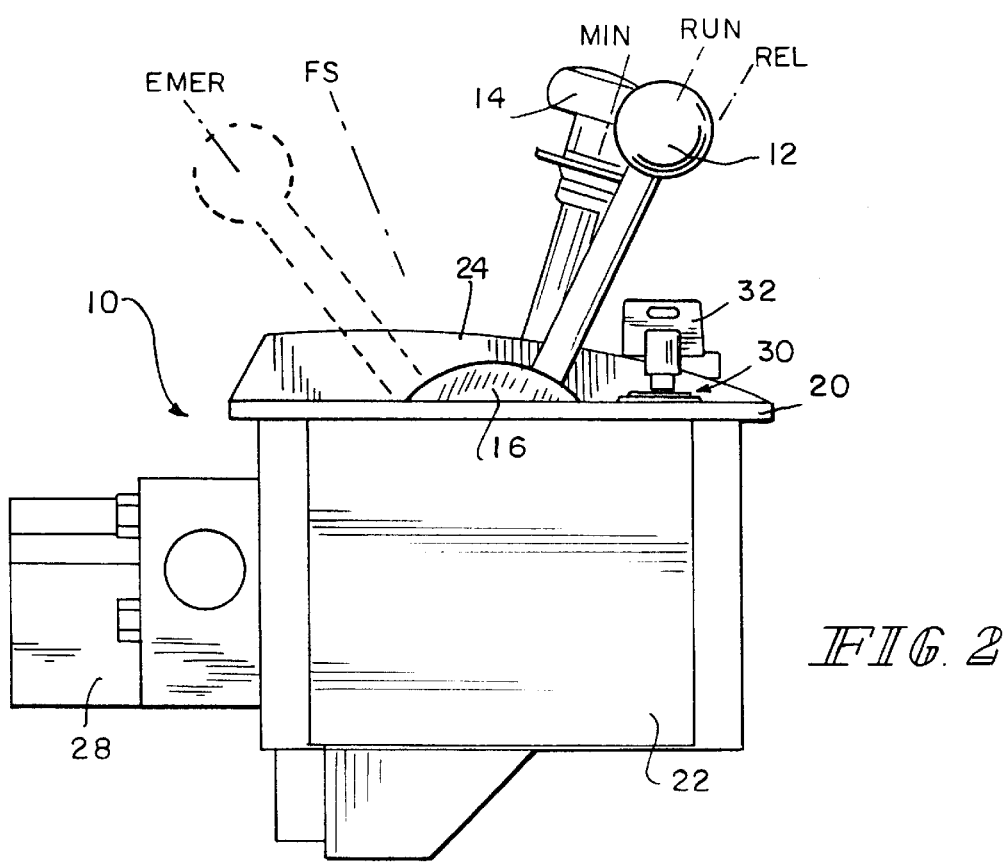
FIG. 2 is a side view of the brake controller of FIG. 1 according to the principles of the present invention.

A brake controller 10 is illustrated in FIG. 1 as including an automatic brake handle 12 and an independent brake handle 14 each mounted to a hub 16 and 18 respectively. A portion of the hubs 16 and 18 and the handles 12 and 14 extend through a cover 20 of the housing 22 of the brake controller. A legend plate 24 is provided to illustrate the brake positions of the handles 12 and 14. The automatic brake handle 12 has emergency EMER, full service FS, minimum service MIN, run RUN and release REL positions. The independent brake handle 14 varies between full service FULL and release REL. Selector 26 determines the condition of the brake controller including positions helper HLPR, trail TRL, lead and test. An interface block 28 illustrated in FIG. 2 provides a pneumatic and electrical interface of the brake controller 10 to the remainder of the brake system.

Also mounted to the top plate 20 and extending exterior of the housing is a key lock 30 including key 32. A legend plate 34 indicates the locked and unlocked position of the lock 30. As illustrated, they are generally 90° degrees apart.

Figure 3:
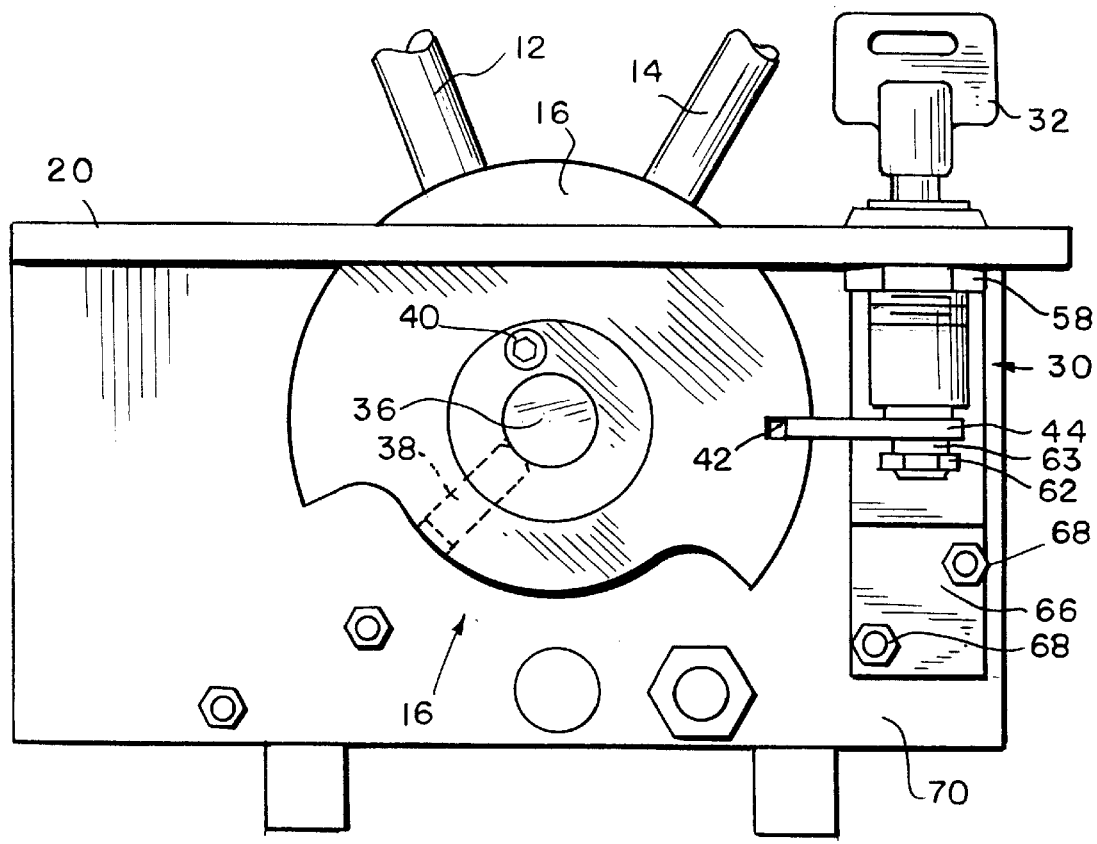
FIG. 3 is a partial side view of a controller including the lock mechanisms of the present invention in its locked position with the side of the housing removed.

As illustrated in FIG. 3, the hub 16 is mounted to a shaft 36 by screw 38. The handle 12 is mounted to the hub 16 by fastener or screw 40. The position of the handle through the hub rotates the shaft 36 which produces appropriate braking by controlling pneumatic or electric responses. The same structure is provided for the independent brake 14 and hub 18. It should be noted that the description so far is a standard brake controller, for example, from New York Air Brake except for the key lock 30, 32.

Figure 7:
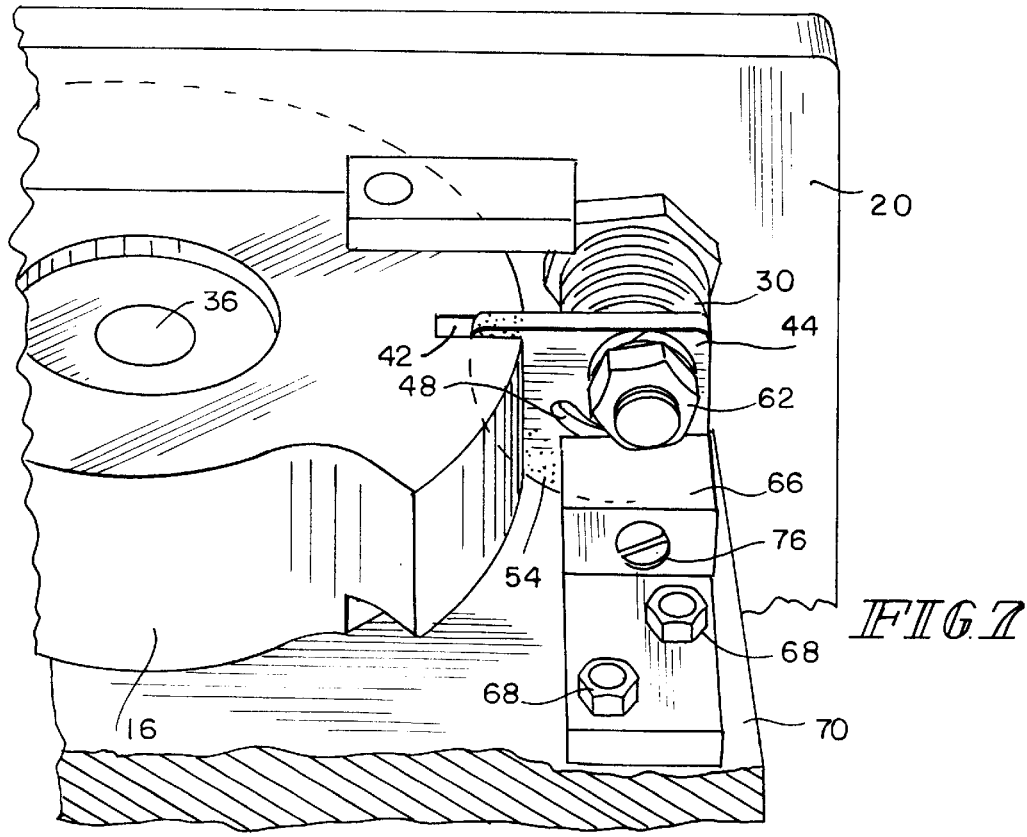
FIG. 7 is a perspective of the brake controller with a lock device of the present invention in the locked position.
Figure 8:
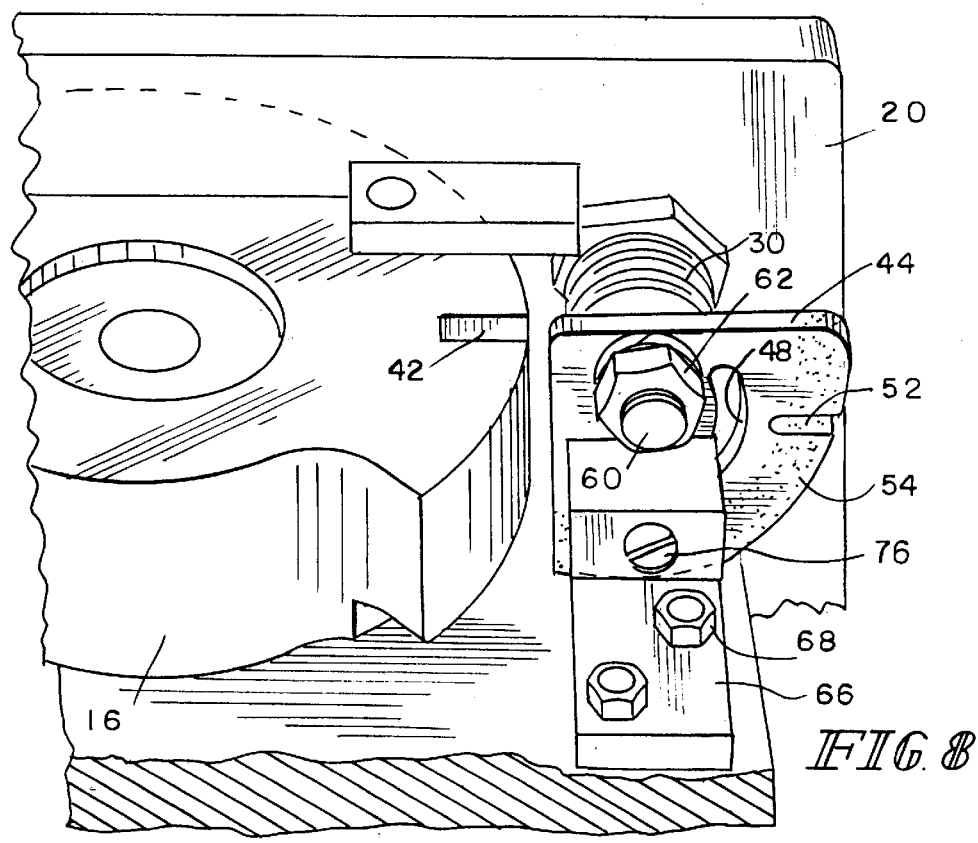
FIG. 8 is a perspective of a brake controller and lock device according to the principles of the present invention in the unlocked position.

As illustrated in FIGS. 3, 7 and 8, the hub 16 includes a notch 42. The lock 30 includes a pawl 44 which is rotatable between an unlocked position out of the notch as illustrated in FIG. 8 and a locked position in the notch 42 as illustrated in FIGS. 3 and 7, when the handle is in a predetermined angular position. Preferably, this predetermined angular position for locking is the full service application. This locks the train in a full service or braked condition.

Figure 4:
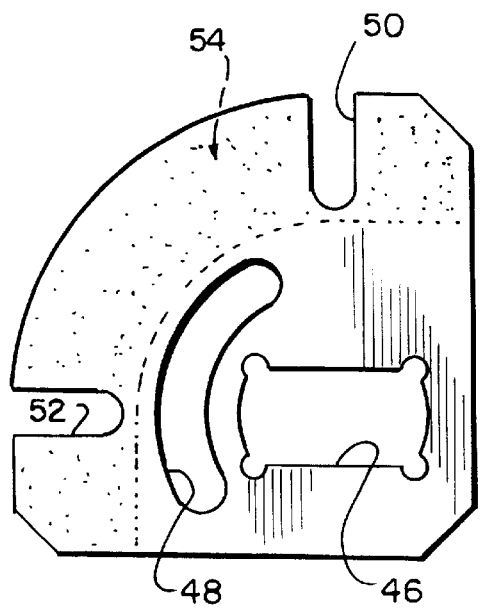
FIG. 4 is a plan view of the pawl of the present invention.

As illustrated in FIG. 4, the pawl 44 includes a lock recess 46 to receive the cylinder of the lock. It also includes an arcuate recess 48 to receive a pin of the lock. The arcuate recess 48 with a pin of the lock limits the angular position of the pawl 44 and the cylinder of the lock 30. A pair of circumferally spaced recesses 50 and 52 define the locked and unlocked position of the pawl 44 in combination with a plunger shown in FIG. 6 and to be described. The area 54 between the recesses 50 and 52 is hardened in that the plunger rides on this area.

Figure 5:
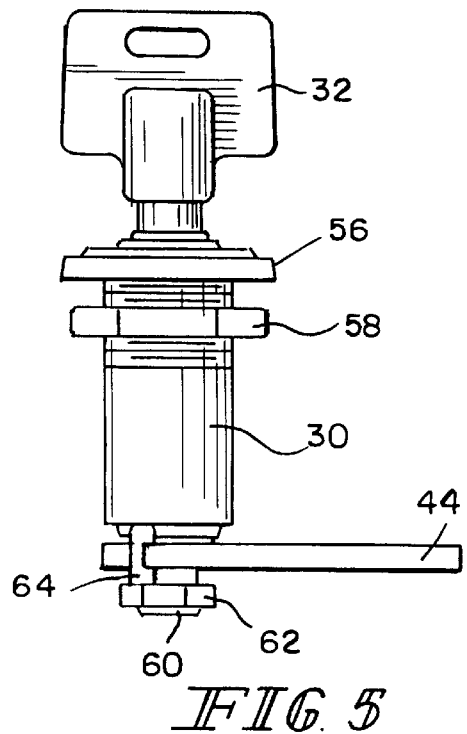
FIG. 5 is a side view of a key lock assembly and pawl according to the principles of the present invention.

As illustrated in FIG. 5, the lock 30 includes a top plate 56 and a nut 58 with the cover 20 therebetween to mount the lock assembly 30 to the cover 20. The recess 46 of the pawl 44 is provided on cylinder 60 of the lock 30 with a pin 64 extending into the arcuate recess 48 of the pawl 44. A fastener 62 and locking washers 63 secures the pawl on the cylinder.

Figure 6:
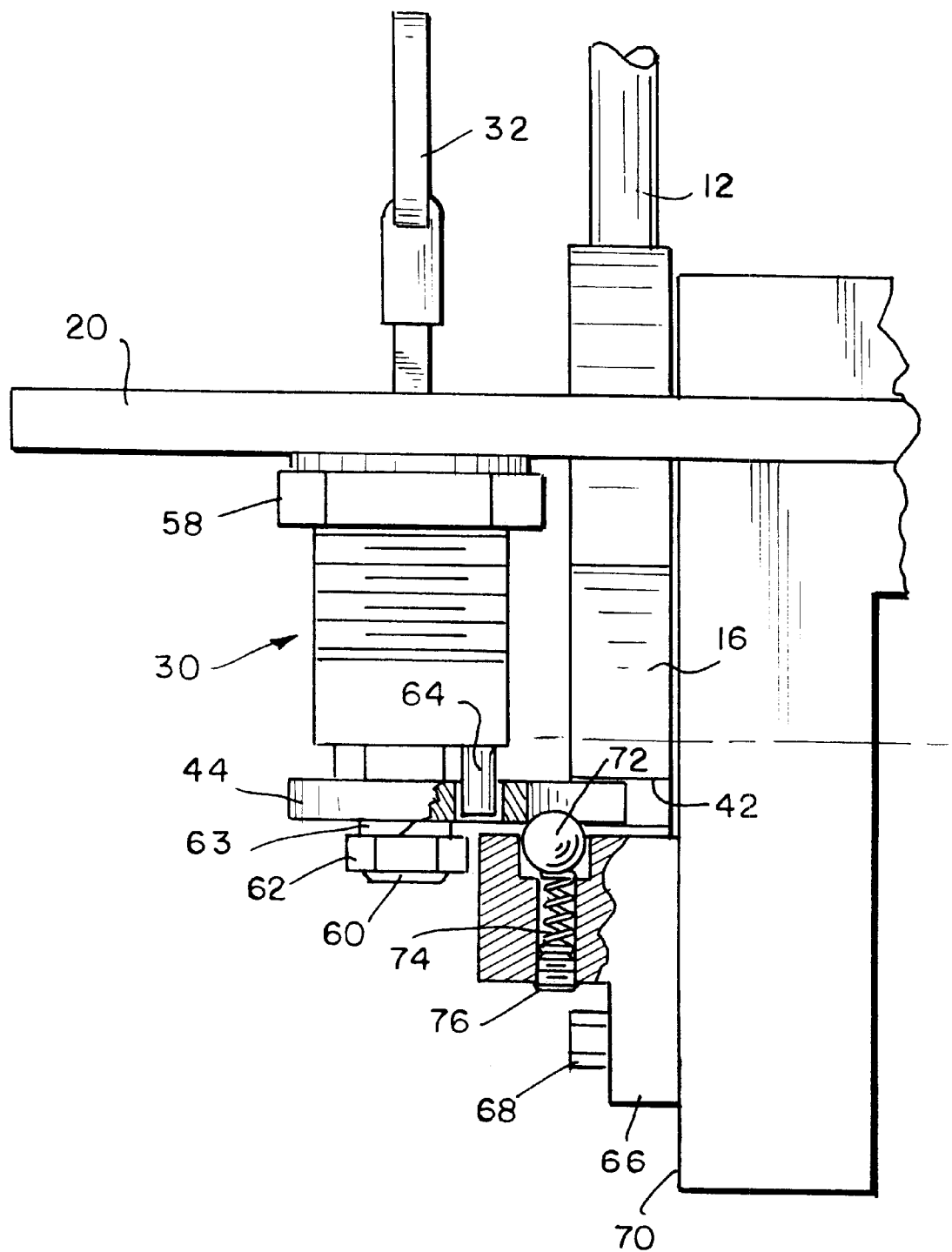
FIG. 6 is a front view of the lock device according to the principles of the present invention.

As illustrated in FIGS. 3 and 6–8, a bracket 66 is secured by fastener 68 to interior wall 70 of the brake controller. The bracket 66 positions a plunger 72 in the path of the circumferally spaced recesses 50 and 52 of the pawl 44 as illustrated in FIG. 6. The plunger 72 may be a ball or cylinder biased by spring 74 held in the bracket 66. The plunger 72 comes to rest in one of the recesses 50 and 52 when it is adjacent the plunger and the pawl is in its locked or fully unlocked positions.

It should be noted that the handle 12 and the hub 16 rotate in a horizontal plane while the lock 30 and pawl 44 rotate about a vertical axis.

The operation of the locking mechanism is as follows. When the automatic handle 12 is in its full service position, the key 32 is rotated to its locked position placing the pawl 44 in the notch 42. The key 32 may then be removed. This locks the handle in the automatic position. To unlock the handle 12 to allow automatic handle operation, the key 32 is inserted in the lock 30 and rotated to its unlocked position. This rotates the pawl 44 out of the notch 42 as illustrated in FIG. 8. Once it has reached its fully unlocked position, the plunger 72 comes to rest in recess 50. This maintains the pawl in its unlocked position and prevents movement due to vibration. It should also be noted that the lock pin 64 engages one of the end walls of the arcuate recess.

The rotation of the key between its locked and unlocked position must overcome the spring biasing of the plunger 72.

If the operator wants to leave and secure the brake controller, he moves the automatic brake handle 12 into its full service position, then he rotates the key 32 and lock 30 to its locked position. This rotates the pawl 44 into the notch 42. When the rotation is complete by pin 64 engaging the end of arcuate recess 48, the spring plunger 72 will positively position the pawl in the lock by the plunger engaging recess 52 in the pawl. The key cannot be removed to disable the operation without the brake handle in its full service position.

The specific hub 16 with the recess 42, the key 30 and lock 32 with the pawl 44, the bracket 66 and the plunger 72 may be part of the original equipment or may be provided as a retrofit kit. Although the plunger 72 is illustrated as a ball and a spring, other plungers or mechanisms may be used.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A rail brake controller with a locking device comprising:
   a handle coupled to a hub;
   a notch in the hub; and
   a pawl rotatable between an unlocked position out of the notch and a locked position in the notch when the handle is in a preselected angular position;
   wherein the pawl includes two circumferentially spaced recesses defining a locked and unlocked position of the pawl; and including a plunger engaging the pawl and in the path of the recesses.

2. The brake controller according to claim 1, including a key lock assembly coupled to the pawl and controlling the position of the pawl.

3. The brake controller according to claim 1, wherein the handle and the hubrotate about a horizontal axis and the pawl rotates about a vertical axis.

4. A rail brake controller with a locking device comprising:
   a handle coupled to a hub;
   a notch in the hub;
   a pawl rotatable between an unlocked position out of the notch and a locked position in the notch when the handle is in a preselected angular position; and,
   a key lock assembly coupled to the pawl and controlling the position of the pawl;
   wherein the pawl includes an arcuate recess and the lock assembly includes a pin in the arcuate recess to limit the angular position of the pawl.

5. The brake controller according to claim 4, wherein the pawl includes two circumferentially spaced recesses defining a locked and unlocked position of the pawl; and including a plunger engaging the pawl and in the path of the recesses.

6. The brake controller according to claim 5, wherein the handle and the hub rotate about a horizontal axis and the pawl rotates about a vertical axis.

7. A kit for retrofitting a rail brake controller with a locking device, the kit comprising:
   a hub for a handle and the hub including a notch;
   a pawl to be mounted adjacent the hub for rotation between an unlocked position out of the notch and a locked position in the notch when the hub is in a preselected angular position; and,
   a key lock assembly coupled to the pawl and controlling the position of the pawl;
   wherein the pawl includes an arcuate recess and the lock assembly includes a pin in the arcuate recess to limit the angular position of the pawl.

8. The kit according to claim 7, wherein the hub rotates about a horizontalaxis and the pawl rotates about a vertical axis.

9. A kit for retrofitting a rail brake controller with a locking device, the kit comprising:
   a hub for a handle and the hub including a notch; and
   a pawl to be mounted adjacent the hub for rotation between an unlocked position out of the notch and a locked position in the notch when the handle is in a preselected angular position;
   wherein the pawl includes two circumferentially spaced recesses defining a locked and unlocked position of the pawl; and including a plunger and a bracket to position the plunger to engage the pawl and in the path of the recesses.

10. The kit according to claim 9, including a key lock assembly coupled to the pawl and controlling the position of the pawl.

11. The kit according to claim wherein the hub rotates about a horizontal axis and the pawl rotates about a vertical axis.

* * * * *